United States Patent [19]

Boyd et al.

[11] 3,991,405

[45] Nov. 9, 1976

[54] MARGIN ADJUSTING OF TEXTUAL CODES IN A MEMORY

[75] Inventors: William Weller Boyd; Wayne Finis Rogers; James Wilson Toups, all of Austin, Tex.

[73] Assignee: International Business Machines Corporation, Armonk, N.Y.

[22] Filed: July 14, 1975

[21] Appl. No.: 595,637

Related U.S. Application Data

[63] Continuation of Ser. No. 428,274, Dec. 26, 1973, abandoned.

[52] U.S. Cl. .............................................. 340/172.5
[51] Int. Cl.$^2$ ........................ G06F 3/12; G06F 5/00
[58] Field of Search .................................. 340/172.5

[56] References Cited

UNITED STATES PATENTS 3,864,669 2/1975 Schlickeiser et al. ............ 340/172.5

*Primary Examiner*—Melvin B. Chapnick
*Attorney, Agent, or Firm*—Douglas H. Lefeve; James H. Barksdale, Jr.

[57] ABSTRACT

A system for automatically arranging a stored sequence ot textural character codes and control codes to provide textual line lengths within a predetermined range. If a tab code is detected within the stored sequence, the amount of line length corresponding to the tab code is calculated by the control logic, since the tab code, itself, includes no indication of the amount of line length for execution of the tab code. The number of character codes and space codes on a line containing a tab code is reduced to accommodate the line length required to execute the tab code upon print-out by a printer. In forming a group of codes corresponding to a line, a hyphenation decision may be necessary when inclusion of a word at the end of a line would result in too great a line length, while exclusion of the word would result in too short a line length. When hyphenation decisions are to be made during automatic adjustment of the stored code sequence, only the word involved in the hyphenation decision is printed for operator viewing. The number of the line on which the decision must be made is also printed, since this may influence the hyphenation decision. Further, another indication is included with the print-out if the word involved in the hyphenation decision is the last word of a paragraph. No other printing is performed during this automatic margin adjusting operation and, thus, the printer functions only as an operator readable output device when hyphenation decisions are required. The time required to adjust the margins of a page of text in this manner can, therefore, be extremely short in comparison to the time required when printing is included in the adjust operation, because the operation disclosed herein is not limited by the speed of the printer.

11 Claims, 6 Drawing Figures

MARGIN ADJUSTING OF TEXTUAL CODES IN A MEMORY

This is a continuation of application Ser. No. 428,274 filed Dec. 26, 1973, now abandoned.

CROSS-REFERENCE TO RELATED APPLICATIONS

U.S. patent application Ser. No. 427,616, filed Dec. 26, 1973, entitled, "System and Method for Aligning Textual Character Fields", having D. W. Cooper, et al as inventors, now U.S. Pat. No. 3,914,745.

U.S. patent application Ser. No. 428,273, filed Dec. 26, 1973, entitled "System for Unattended Printing", having W. W. Boyd, et al as inventors, now U.S. Pat No. 3,958,224.

U.S. patent application Ser. No. 428,542, filed Dec. 26,1973, entitled, "Centering of Textual Character Fields about a Point", having D. W. Cooper, et al as inventors, now U.S. Pat. No. 3,924,723.

BACKGROUND OF THE INVENTION

1. Field of the Invention

This invention relates generally to automatic margin adjusting systems, and more particularly to a high speed system for automatically adjusting line lengths of a textual code sequence stored in a memory before the entire sequence of codes is output from the memory to an output device.

2. Description of the Prior Art

A variety of systems are known in the prior art for providing some degree of right margin adjustment during the print-out of characters stored in a memory or bulk media. When a relatively small variation in line length has been desirable, a "hot zone" is usually established comprising a relatively small number of character print positions immediately preceding the desired maximum right margin. Depending on the prior art system, the first or last interword space code in the "hot zone" has been replaced by a line terminating code in the stored sequence of character and control codes corresponding to the printed text.

Prior art systems such as those described above generally include a printer that is operated during this right margin adjusting operation. An operator may be required during the margin adjusting operation to make occasional hyphenation decisions in instances wherein a word entirely spans the "hot zone" of a system that automatically inserts a line ending code only in the event that a space code or a hyphen code is found within the "hot zone". Although only occasional hyphenation decisions may be required, an operator, having no advance warning of when the hyphenation decisions will be required, must be present throughout the adjusting operation. This requires a large amount of operator time which, otherwise, may be wasted during the large proportion of print-out time during which no hyphenation decisions are necessary.

The publication "Preparing Media for Unattended Printing", IBM Technical Disclosure Bulletin Vol. 14, No. 7, page 2105 (December 1971) discloses a method of margin adjustment wherein the necessary revisions in the placement of line ending codes of text stored in a buffer are made during a revision pass of the text in the buffer during which hyphenation decisions are made and stored. The operator establishes a desired range of line lengths including a "hot zone". The text stored in the buffer is then scanned and only the words overlapping the "hot zone"and requiring hyphenation decisions are printed out. Since the scanning of the text in the buffer may be performed at a high speed that is not limited by the printer, a large amount of text may be adjusted in this manner in a relatively short time. Further, the time during which the buffer is scanned and during which line termination decisions are automatically made becomes relatively small compared to the time required for the printer to print words requiring a hyphenation decision and for the operator to make the decisions. Thus, relatively little time is wasted in having the operator present during the margin adjustment operation. No teaching is provided in the above publication, however, of providing an indication to the operator of the line number on which the word requiring a hyphenation decision occurs. A knowledge of the line number for each hyphenation decision would be useful to the operator, because it may be undesirable, for example, to hyphenate on two or more consecutive lines. In such instances, the operator may desire to include the entire word on one of the lines or move the entire word to the succeeding line.

Further, no teaching is included in this publication of providing an indication to the operator that the word requiring a hyphenation decision is the last word of a paragraph. An indication of this situation would be desirable to the operator, since it may be undesirable, from a grammatical standpoint, to hyphenate the last word of a paragraph.

Another example of a margin adjustment system that may be operated in a high speed mode is found in U.S. Pat. No. 3,772,655, entitled "Method of Obtaining Correspondence Between Memory and Output". In the system disclosed by this patent, line lengths may be adjusted during output of the character and control codes from a buffer memory to a bulk storage device. As in the above publication, however, no teaching is included in this patent of the provision of a line number indication with each hyphenation decision or the provision of an indication that a word requiring a hyphenation decision is the last word of a paragraph when such is the case.

Further in neither of these prior art references is there any teaching found regarding the handling, during an adjustment operation, of tab codes included in the sequence of text codes. When a printer is operated during margin adjustment, as in the systems first described above, the portion of the line length consumed by execution of the tab code can be determined from the printer for use in the adjustment procedure. Thus, for tabulation operations requiring increasingly longer portions of the line length, a smaller number of characters and spaces is combined with the tab code to form a line of the desired length. However, in systems wherein a tab code is not associated with a predetermined printer escapement, it would be necessary to provide a means for determining the proportion of the printed line length to be consumed by execution of the tab code if a high speed margin adjustment operation, not limited by relatively slow printer speed, is to be performed in the memory.

In the display system of U.S. Pat. No. 3,744,033, entitled, "Text Formatting for Display", an electronic tab rack comprising a random access memory is provided, having a bit storage position corresponding to each character position on the line to be displayed. Tabulation stops are electronically stored in selected character positions by setting the particular bits corresponding thereto. In this manner, a count can be made corresponding to the number of character positions between tabulation points. Space codes are input to the refresh buffer to fill blank spaces in lines in which tabulation operations are indicated. In storing and adjusting lines of text in a buffer to be printed, however, it would be inefficient to replace a single tab code with a varying plurality of space codes, according to the method of this patent, because valuable storage space would become unavailable for storage of text characters to be printed.

It would, therefore, be advantageous to provide a system for automatically performing a high speed arrangement of stored textual character codes and control codes, including tab codes, thereby providing line lengths within a predetermined range. When hyphenation decisions are required, it would be advantageous to provide an operator readable indication of the line number on which the decision must be made and an indication of whether or not the word involved is the last word in a paragraph.

SUMMARY OF THE INVENTION

Accordingly, a system is provided wherein textual character codes and control codes, including tab codes, may be input from a keyboard to a memory, which in the preferred embodiment may be a dynamic shift register. A random access memory electronic tab rack includes a bit storage position for each character position along the line of a printer. Tabs set from the keyboard cause the corresponding bits in the electronic tab rack to be set. In an adjustment operation, control logic is provided for comparing the accumulated count of escapement codes in the memory with a predetermined right margin count minus the "hot zone" width. Carrier return codes occurring before a compare is reached are replaced with delete codes. In the "hot zone", a carrier return code is inserted in the position of the last proper line terminating condition existing therein. If no such condition exists in the "hot zone" the control logic enables an output device to print out the entire word that spans the "hot zone". Included in this print out is the line number on which the non-terminating condition occurred, as well as an indication to the operator of whether or not the word is the last word of a paragraph.

When a tab code is sensed during this adjustment procedure, logic is provided for calculating the amount of space required for eventual printer execution of the tab code by counting the number of character positions between appropriate tab codes in the electronic tab rack. The number of character codes and control codes to be included in the line including the tab code is, thus, diminished in accordance with the amount of space that will be required for execution of the tab code by the printer or other output device.

The foregoing and other features and advantages of the invention will be apparent from the following more particular description of a preferred embodiment of the invention as illustrated in the accompanying drawings.

DETAILED DESCRIPTION OF THE PREFERRED EMBODIMENT

Figure 1:
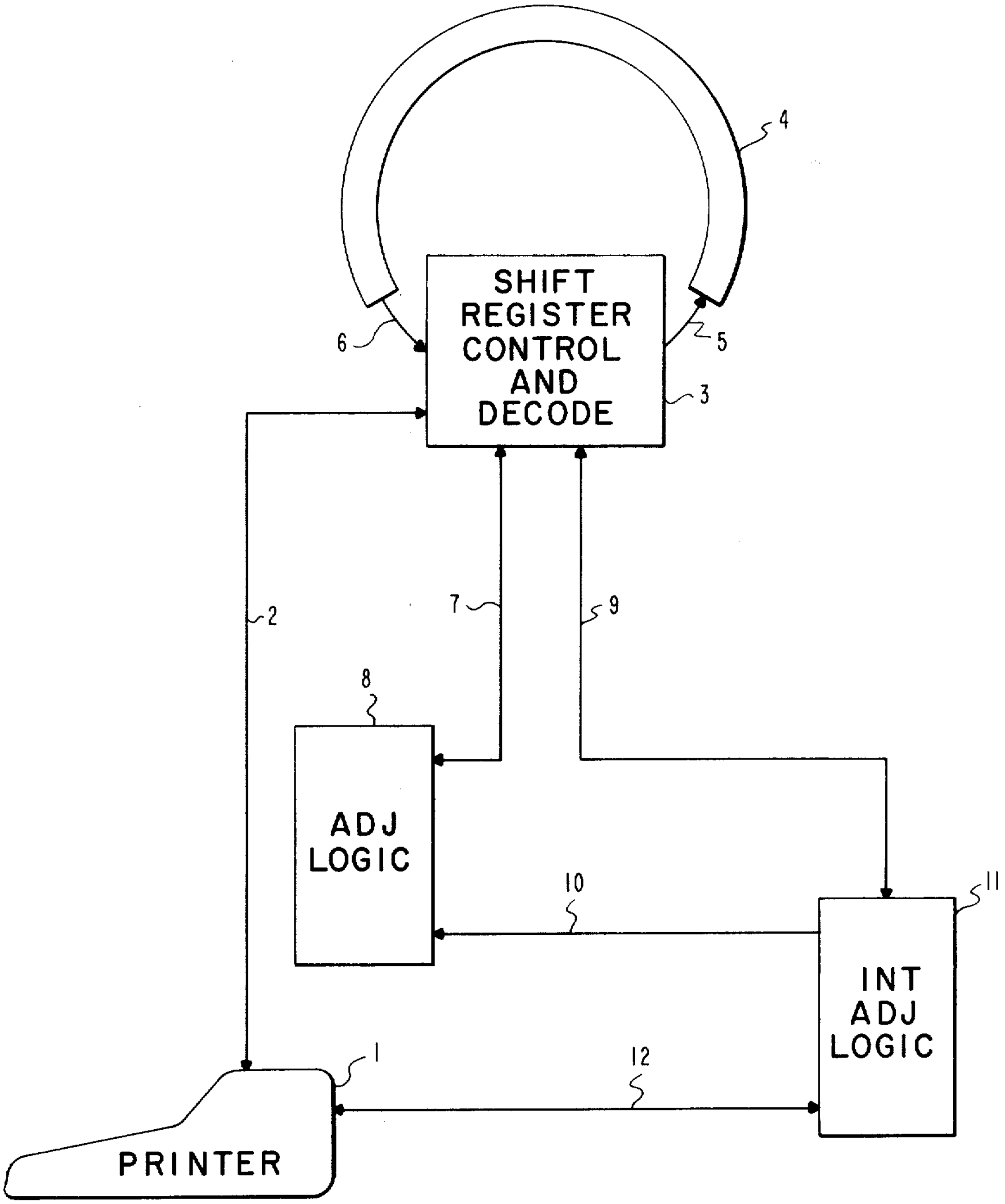
FIG. 1 is an overall block diagram illustrating the interconnection of the margin adjustment logic and memory with a printer.
Figure 3:
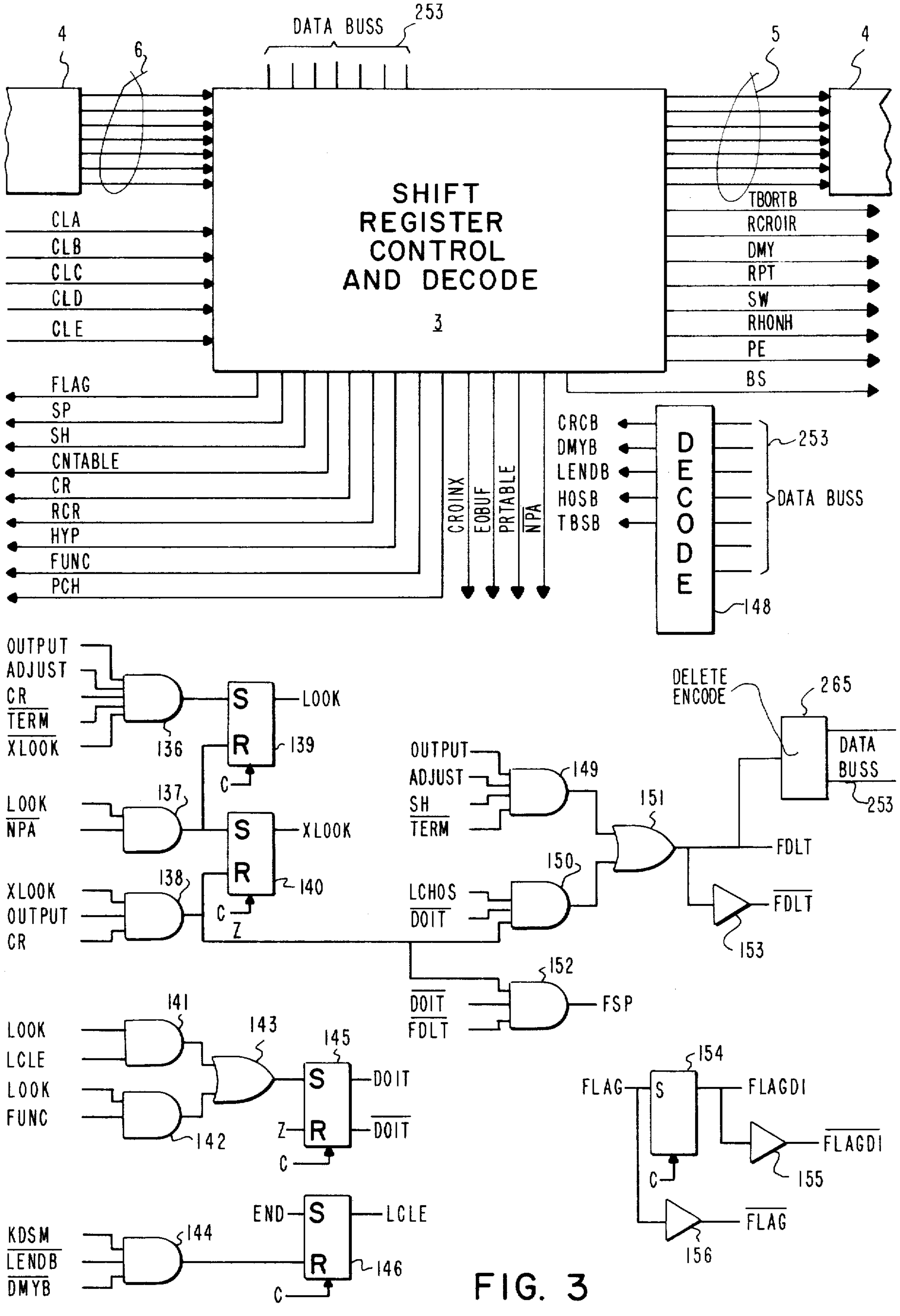

Refer first to FIG. 1, wherein is shown a keyboard-printer 1, or other similar input/output device, in two-way communication along cable 2 with shift register control and decode 3. The shift register control and decode 3 may include logic of the type described in the cross-referenced copending applications, now U.S. Pats. 3,924,723 and 3,914,745, both filed Dec. 26, 1973. This logic is shown in FIG. 3 of both patents and is described at column 4, lines 48–68; Column 5, lines 1–68; and Column 6, lines 1–28 of U.S. Pat. No. 3,924,723. A substantially identical written description is also found in U.S. pat. No. 3,914,745 at Column 5, lines 14–67 and Column 6, lines 1–67. The output from shift register control and decode 3 is communicated along cable 5 to a dynamic shift register 4 and the output from dynamic shift register 4 is communicated along cable 6 back into the shift register control and decode 3. Shift register control and decode 3 is also in two-way communication along cable 7 to adjust logic 8 and, likewise, is in two-way communication along cable 9 to internal adjust logic 11. The internal adjust logic 11 provides a second input along cable 10 into adjust logic 8. The internal adjust logic 11 is, likewise, in two-way communication along cable 12 with the keyboard-printer 1.

While the makeup of the adjust logic 8 and interal adjust logic 11 will be described hereinafter in greater detail, a brief explanation will be given of the functions as associated with the keyboard-printer 1, shift register 4, and shift register control and decode 3. Operationally, character codes and control codes are generated by keying into the keyboard-printer 1, and these codes are input along cable 2 to the shift register and decode 3 and are, thereafter, entered into and circulated through the dynamic shift register 4. It will, of course, be obvious to those skilled in the art that while keyboard-printer 1 is shown, characters may be generated for entry into the shift register 4 by means of other input devices such as tape units, magnetic card units, and communications lines. The codes entered into the dynamic shift register 4 are circulated therein in accordance with the description given in U.S. Pat. No. 3,675,216 to Randell L. James, Ser. No. 104,888, filed Jan. 8, 1971, issued July 4, 1972, and entitled "No Clock Shift Register and Control Technique". Briefly, additions, deletions, and insertions of control codes can be accomplished in the dynamic shift register by operator keying from keyboard-printer 1. As explained in detail therein, the dynamic shift register memory comprises m character storage positions of $n$ bits in width. The data is continually recirculated throughout the memory in the form of a loop. An $n$ bit operation flag code is initially written into one of the storage locations while $n$ bit dummy codes are written into the remainder of the storage locations. Each character or control code to be inserted into the memory is inserted into the memory location that precedes the operation flag and the remainder of character or control codes and dummy codes are shifted to accommodate the insertion. In a similar manner, the operation flag code may be used to define the point of output of characters and control codes from the memory. Thus, the operation flag defines the operation point within the memory without the necessity for clocking between an input-/output device connected to the memory and without a complex addressing system to determine the appropriate memory locations for input or output operations. Codes circulated through the dynamic shift register control and decode 3, likewise, are used by the adjust logic 8 which operates partially under the control of the internal adjust logic 11 as explained hereinafter.

The difference between adjust logic 8 and internal adjust logic 11 is that the adjust logic 8, working from a predetermined desired line length, operates during print-out on keyboard-printer 1 and causes the printer to terminate printing on a line when certain conditions are not met such that hyphenation decisions, for example, may be made. The internal adjust logic 11 controls the adjust logic 8 in the internal adjust mode wherein adjustment of line lengths are made to the codes stored in dynamic shift register 4 without the necessity of simultaneous print-out. Thus, without the internal adjust logic 11, adjustment of line lengths using only the adjust logic 8 is limited by printer speed. In the internal adjust mode of operation, the internal adjust logic 11 scans the codes, as they are circulated through dynamic shift register 4 and shift register control and decode 3, at memory speed. During this time the printer is not printing, and the internal adjust logic 11 scans the characters at the rate at which they are circulated in the dynamic shift register. Thus, in the internal adjust mode of operation the system is not limited by printer speed. However, groups of codes which are detected that do not meet the predetermined desired line length conditions, and on which hyphenation decisions are required, are caused by the internal adjust logic 11, operating on the adjust logic 8, to be printed out for hyphenation decisions.

The emphasis here is that the internal adjust logic scans the contents of the dynamic shift register 4 at the dynamic shift register speed when in the internal adjust mode and, thus, the adjusted sequence and resultant throughput is orders of magnitude greater, in the usual case, than can be accomplished when using ordinary output printing devices having relatively slow operating speeds.

Referring now to FIG. 3, the shift register control and decode 3 supplies a data buss 253 from which contain codes are decoded through decode 148. The following listing is given of the particular codes that are decoded by decode 148, along with the corresponding labels appearing adjacent the output lines thereof, in FIG. 3: carrier return code — CRCB, dummy code — DMYB, line end code — LENDB, hyphen code or space code — HOSB, and tab code — TBSB.

A plurality of decode signals are also output from the decode portion of shift register control and decode 3, as the codes pass therethrough during their recirculation in the shift register. Some of the codes decoded thereby are listed as follows along with the corresponding abbreviations appearing adjacent the output lines in FIG. 3: operation flag code — FLAG, space code — SP, normal hyphen code — SH, countable character code — CNTABLE, carrier return code — CR, required carrier return code — RCR, hyphen code — HYP, function code — FUNC, and print character code — PCH. The hyphen decode, HYP, provides a positive level when either a normal hyphen or a required hyphen is decoded. The function decode, FUNC, is a combination of several decodes which make up a group of functions including space codes, backspace codes, carrier return codes, required carrier return codes, index return codes, index codes, and tab codes as will be described below. Other codes or groups of codes decoded by shift register control and decode 3 will also be described below. The countable character codes include space codes, print character codes, and required space codes.

The codes circulate in the dynamic shift register 4, exit through data cable 6 into the shift register control and decode 3, and exit from the shift register control and decode 3 to cable 5 back into dynamic shift register 4. Also associated with the shift register control and decode 3 are five control lines. As shown and explained in detail in the above-referenced, copending applications, now U.S. Pats. Nos. 3,924,723 and 3,914,745, filed Dec. 26, 1973, control line A (CLA) is used to place a code from the shift register control and decode 3 onto the data buss. Control line B (CLB) and control line E (CLE) are used in conjunction with the insertion of codes into the dynamic shift register memory. Control line D (CLD) is used to allow a code which succeeds the operation flag code to be moved into a position preceding the operation flag code. Control line C (CLC) is not used with respect to this invention.

In order to utilize the internal adjust logic 11 in the internal adjust mode, the entire system as shown in FIG. 1 must come under the control of the internal adjust logic 11. Therefore, other operations must be locked out that would interfere with the internal adjust operation, such as the keyboarding of codes and mode selections other than those described below. When the interfering operations are locked out the SYSBSY signal is not positive, as described hereinafter.

Figure 2A:
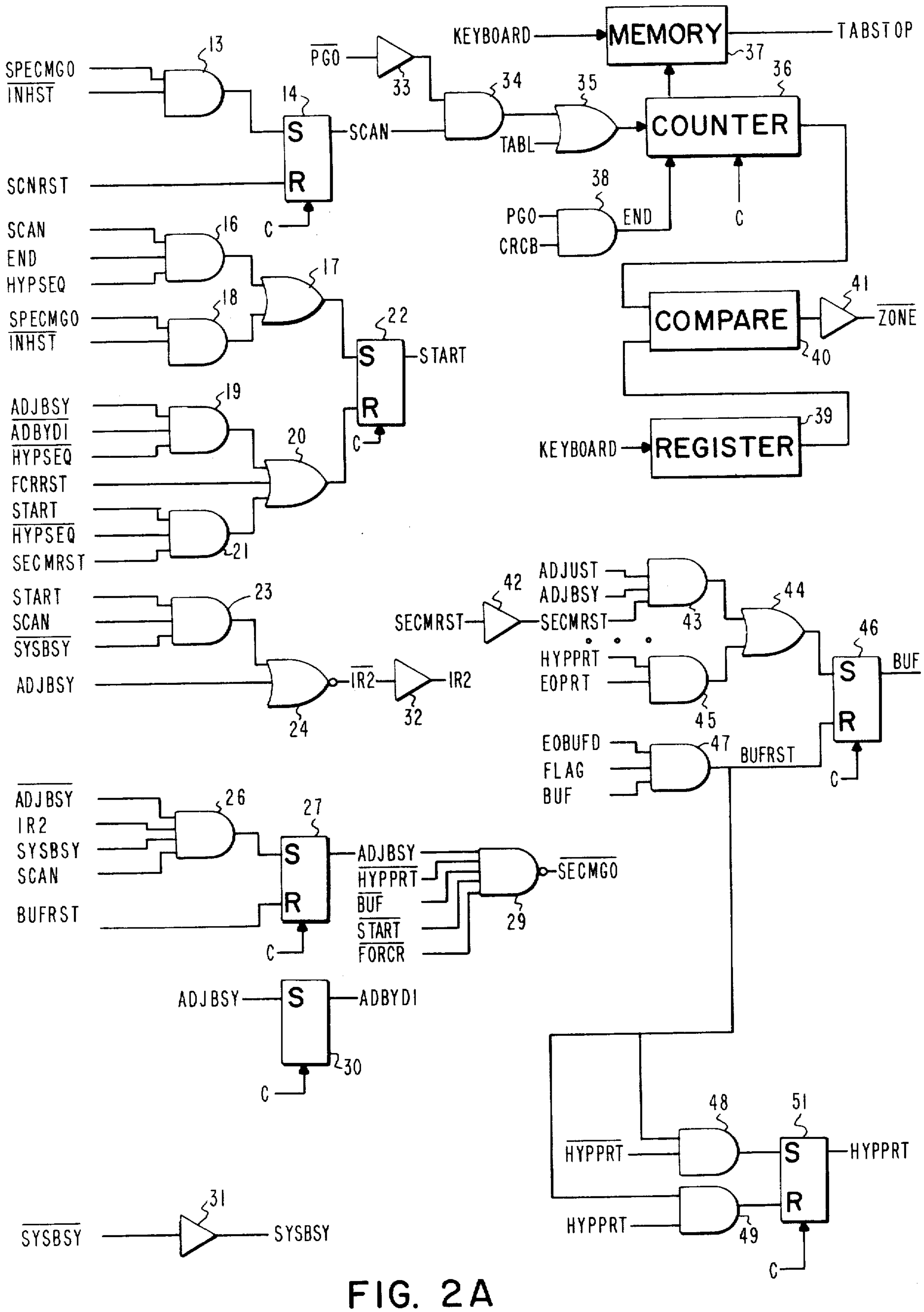
FIGS. 2A, 2B, 3, 4, and 5 show the logical elements of a preferred embodiment of the margin adjusting system of this invention. The logical elements should be considered to be connected to each other according to signal names appearing at the input and output terminals thereof, as will be understood by those skilled in the art.

Assume now that shift register 4 has been loaded with a sequence of textual codes corresponding to lines and paragraphs of text, input from keyboard-printer 1. Prior to the initiation of an internal adjust operation for adjustment of the line endings of the stored codes into a different format for print-out, certain information must be input from the keyboard-printer 1. Referring now to FIG. 2A, the internal adjust logic includes a random access memory 37 which is loadable from the keyboard-printer 1 and stores tab stops which are set by the operator. The random access memory 37 includes separate bit storage positions for each character print position on the print line of keyboard-printer 1. Tab stops may be stored in random access memory 37 by escaping the print carrier of keyboard-printer 1 to a desired tab position and activating a tab-set switch on the keyboard, which, in turn sets the bit storage location in random access memory 37 corresponding to the chosen printer location on keyboard-printer 1. Register 39 is also loadable from keyboard-printer 1 and may be loaded with a number equivalent to the desired right margin count minus eight characters. The number may be loaded into register 39 by positioning the print carrier at the left margin of keyboard 1, spacing out to the desired right margin point, and depressing a margin set key which activates a signal to gate a number into register 39 equivalent to the number of spaces through which the print carrier was spaced minus 8.

To initiate the internal adjust operation, an internal adjust key is depressed at the keyboard which produces a SPECMGO signal that is input to AND gates 13 and 18. Additionally, AND gates 13 and 18 each receive the additional input signals of INHST. INHST is primarily utilized at those times when it is necessary to inhibit the internal adjust mode of operation from beginning due to various reasons which do not apply to this invention. Thus, the SCAN latch 14 is set, and simultaneously, the START latch 22 is set. (It is assumed that all of the latches shown were reset before the initiation of this mode.) It will also be understood by those skilled in the art that the logical storage devices such as counters, latches, delay circuits, etc, shown in FIGS. 2–5 are responsive to clock signals, denoted "C", to assume, at the next leading edge of the clocking waveform, a state associated with an input signal applied thereto immediately before the leading edge of the clocking waveform, such logic being referred to in the art as synchronous logic.

$\overline{SYSBSY}$ is an interface signal from the remainder of a text processing system that is not shown herein because it forms no part of this invention. $\overline{IR2}$ is another such interface signal that may be generated either by the system disclosed herein or by the remainder of the text processing system (not shown). By definition herein, when $\overline{IR2}$ is driven non-positive (down) for one clock period by the disclosed system, $\overline{SYSBSY}$ is driven down for the next clock period by the remainder of the system (not shown) while, simultaneously, during this next clock period, the system (not shown) drives $\overline{IR2}$ down for a second clock period. If the disclosed system drives $\overline{IR2}$ down for a third clock period, the system (not shown) holds $\overline{SYSBSY}$ down for as long as $\overline{IR2}$ is driven down by the disclosed system.

Referring to FIG. 2A, START and SCAN are anded with $\overline{SYSBSY}$ at AND gate 23 to drive NOR gate 24 that drives $\overline{IR2}$ down which is inverted by inverter 32 to generate IR2. IR2 is generated for one bit time (the equivalent of one clock period of the latches and delay circuits and one shift of the codes in dynamic shift register 4) until SYSBSY ($\overline{SYSBSY}$, inverted by inverter 31) is again positive. At the next bit time the system (not shown) drives $\overline{SYSBSY}$ and $\overline{IR2}$ down. Therefore, at AND gate 26, IR2, SYSBSY and SCAN along with $\overline{ADJBSY}$ set the ADJBSY latch 27, and a bit time later ADBYD1 delay 30 becomes positive. Thus with ADJBSY set the START latch 22 is reset through OR gate 20, having an input enabled by the output of AND gate 19 which, in turn, is enabled by the signals ADJBSY, $\overline{ADBYD1}$ and $\overline{HYPSEQ}$. The ADJBSY signal is gated through NOR circuit 24 to drive $\overline{IR2}$ down which causes the system (not shown) to hold $\overline{SYSBSY}$ down for as long as $\overline{IR2}$ is driven down. Therefore, at NAND gate 29, $\overline{SECMGO}$ is generated by ADJBSY, $\overline{HYPPRT}$, $\overline{BUF}$, $\overline{START}$ and $\overline{FORCR}$, the latter four signals of which will be discussed hereinafter.

Figure 4:
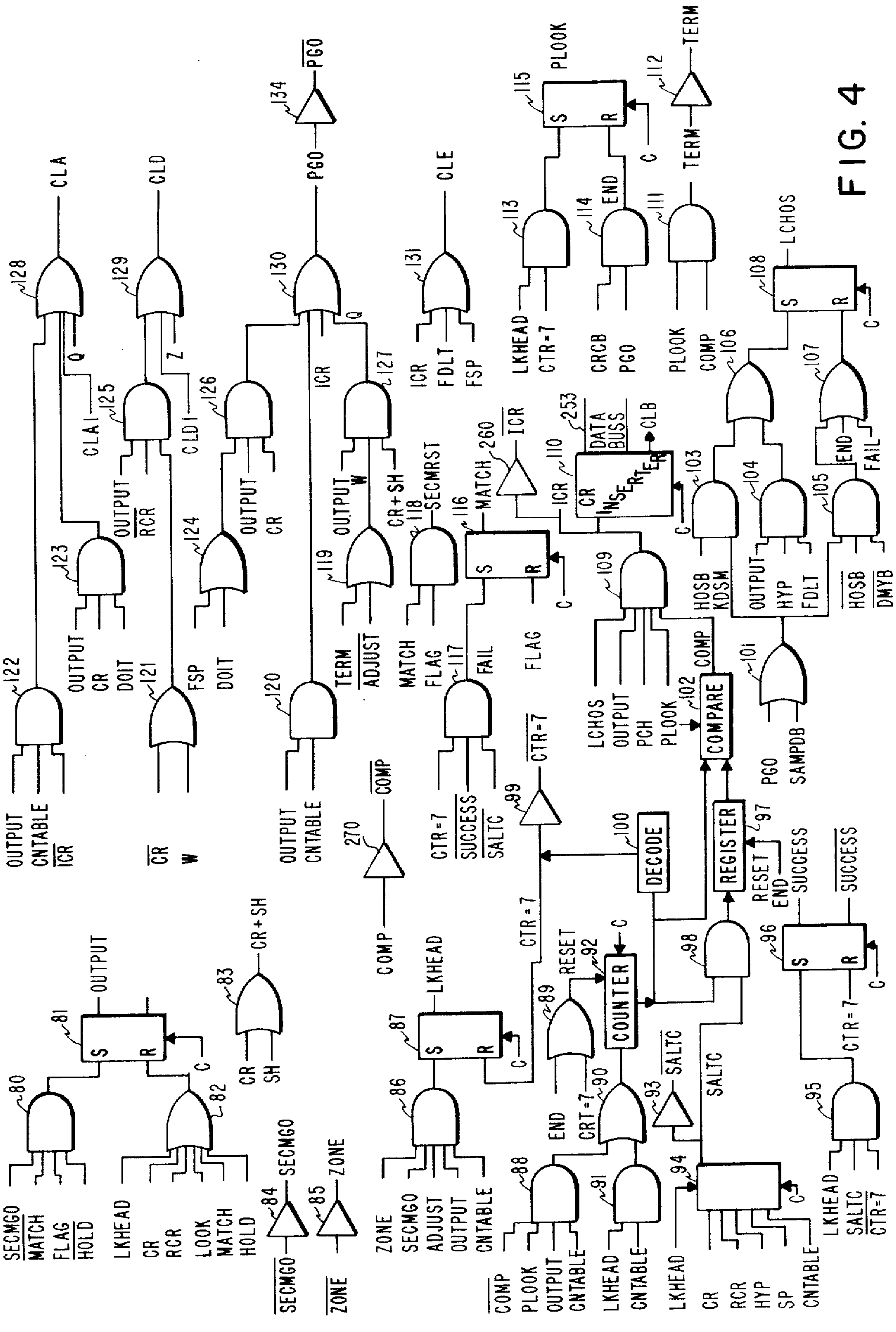

Referring now to FIG. 4, OUTPUT latch 81 is set by a positive output from AND gate 80 which is enabled by the signals SECMGO, ($\overline{SECMGO}$, inverted by inverter 84), $\overline{MATCH}$, FLAG, and $\overline{HOLD}$. At this time the operation flag is trapped in the normal register of the shift register control and decode 3, and scanning commences at the dynamic shift register memory shifting rate. Through AND gate 122 having inputs of OUTPUT, CNTABLE, and $\overline{ICR}$, as described hereinafter, CLA is driven through OR gate 128. CLA (control line A), as previously mentioned, gates the codes from the shift register control and decode 3 onto the data buss.

PGO is generated by OR gate 130 which, in turn, may be enabled by AND gate 120 having inputs of OUTPUT and CNTABLE. PGO is inverted by inverter 134 to provide $\overline{PGO}$. CLD is driven by OR gate 129, having an input from the output of AND gate 125, which is enabled by inputs of OUTPUT, $\overline{RCR}$ and OR gate 121, having inputs of $\overline{CR}$ and W. Thus, each individual code is placed upon the data buss and a PGO is driven. Each code is then routed around the normal register from the input buffer to the output buffer in the shift register and decode 3.

In FIG. 2A, $\overline{PGO}$ is inverted by inverter 33, said inverter having an output which is anded with SCAN at AND gate 34, and the output of AND gate 34 is gated through OR gate 35 to gate the counter 36. The counter, therefore, being continuously gated by PGO, effectively counts the stored countable codes that are being scanned. As scanning continues the contents of counter 36 are continuously being compared by COMPARE 40 to the contents of register 39. When the contents of counter 36 are equal to the contents of register 39, COMPARE 40 generates an output signal that is inverted through inverter 41 to generate a $\overline{ZONE}$ signal.

Referring again to FIG. 4, the $\overline{ZONE}$ signal is inverted in inverter 85 to generate ZONE. At this time the LKHEAD latch 87 is set by an output of AND gate 86, said AND gate having inputs of ZONE, SECMGO, ADJUST, OUTPUT, and CNTABLE. The signal ADJUST is generated at keyboard-printer 1 before entering an adjusting mode to indicate that a "hot zone" is desired in the adjusting operation to be performed.

The preceding and immediately following explanation assumes that the line of text codes stored in dynamic shift register 4 and being scanned for adjustment does not contain a line ending code, such as a carrier return, prior to the "hot zone". If a line ending code were found prior to the "hot zone", the code would activate the non-terminating adjust logic to be described further below.

OUTPUT latch 81 resets by virtue of the LKHEAD signal being gated through OR gate 82. As a consequence of OUTPUT latch 81 being reset, the operation flag code is released from the normal register of the shift register control and decode 3, because CLD is no longer being driven. At this time, a six character lookahead in the adjust logic begins. LKHEAD and CNTABLE, through AND gate 91 and OR gate 90, gate the counter 92. Thus, the counter then counts the countable character codes in the lookahead. A search is now made for suitable line terminating conditions. The object of the search is to select the one line terminating condition in the "hot zone" closest to the right hand margin. Decode 94 is gated by LKHEAD and has inputs of CR, RCR HYP, SP. amd CNTABLE. The function of decode 94 is to generate an output signal upon recognition of a sequence of two codes which satisfy line terminating conditions. Specifically, the sequence of codes satisfying line terminating conditions include a countable character code preceded by either a carrier return code, a required carrier return code, a space code, or a hyphen code. When any of these sequences of codes is detected by decode 94, the signal, SALTC, is generated. This signal enables AND gate 98 to gate the count of counter 92 into register 97 for storage.

Assuming that a satisfactory line terminating condition occurred, thereby generating SALTC, the SALTC signal, along with the LKHEAD and $\overline{CTR = 7}$ (CTR = 7, inverted by inverter 99) signals enable AND gate 95 to produce a positive output level, thereby setting SUCCESS latch 96. Decode 100 produces the signal, CTR = 7, when the seventh counter state in counter 92 occurs. The CTR = 7 signal resets both LKHEAD latch 87 and SUCCESS latch 96. The CTR = 7 signal is gated through OR gate 89 to reset counter 92. Simultaneously, the PLOOK latch 115 is set by virtue of the LKHEAD and CTR = 7 signals being anded through AND gate 113.

It must be remembered that the operation flag code was released from the normal register of shift register control and decode 3 and is progressing through the dynamic shift register memory at this time. When the operation flag does reappear in the shift register control and decode 3, OUTPUT latch 81 is set by a positive output of AND gate 80, said AND gate having the input signals of SECMGO, $\overline{MATCH}$, FLAG, and $\overline{HOLD}$. AND gate 88 is then enabled by the signals $\overline{COMP}$, PLOOK, OUTPUT, and CNTABLE to provide an output signal which is gated through OR gate 90 to enable counter 92 to again count countable character codes. Thus, counts are now being gated to COMPARE 102, which is enabled by the PLOOK signal. Counter 92 is then counted until its count becomes equal to the count stored in register 97 at which time the output of COMPARE 102, COMP, becomes positive, and is inverted by inverter 270 to generate $\overline{COMP}$.

For the simplicity of explanation, it is assumed that only one satisfactory line terminating condition is found in the "hot zone", and that this is the line terminating condition that will be used because, until the contents of counter 92 and register 97 are equal, any line terminating conditions that have been detected are handled by the non-terminating adjust logic that will be explained below. Further assuming that the line terminating condition in this example is a space code followed by a print character code, during this output sequence, a PGO signal gated through OR gate 101 and anded with HOSB and KDSM at AND gate 103 provides a positive output at AND gate 103 which is gated through OR gate 106 to set the LCHOS latch 108. When LCHOS, OUTPUT, PCH, PLOOK, and COMP are each positive, AND gate 109 is enabled to produce the ICR signal, which is inverted by inverter 260 to provide $\overline{ICR}$. Simultaneously, PLOOK and COMP are anded at AND gate 111 to produce TERM which is inverted by inverter 112 to produce $\overline{TERM}$. ICR is gated through OR gate 130 to produce PGO and is also gated through OR gate 131 to produce CLE. The ICR signal also activates carrier return inserter 110. Thus, the carrier return code is put on the data buss and, because CLE (control line E) and CLB (control line B) are positive, the carrier return is gated into the memory by the shift register control and decode 3. The $\overline{PGO}$ signal generated at inverter 134 enables the carrier return to be counted by counter 36 in FIG. 2A.

A positive CRCB signal anded with PGO at AND gate 114 provides an END signal to reset the PLOOK latch 115 of the adjust logic. The END signal is also gated through OR gate 107 to reset the LCHOS latch 108. In this example, the LCHOS latch 108 would have also been reset by a positive signal generated at AND gate 105 and gated through OR gate 107. AND gate 105 generates a positive signal by virtue of PGO being gated through OR gate 101 and $\overline{HOSB}$ and $\overline{DMYB}$. The END signal also resets register 97 and is gated through OR gate 89 to reset counter 92.

Another example of a code sequence handled by this logic is a space code followed by a carrier return code, this sequence being defined as a satisfactory line terminating condition. The sequence of logical signals is the same up through the positive signal COMP being generated by COMPARE 102. At this time, the LCHOS latch 108 is set and the next text code to be decoded is a carrier return code. The adjust logic will leave this carrier return code in the sequence of text codes rather than deleting the space code and replacing it with a carrier return code. Therefore, ICR will not be generated by AND gate 109; however, TERM will be generated by AND gate 111. Since ICR is not positive, the output of AND gate 122 will be positive. With OUTPUT, CNTABLE, and $\overline{ICR}$ each positive, AND gate 122 generates a positive signal that is gated through OR gate 128 to produce CLA. Consequently, the positive TERM is gated through OR gate 119 to generate W. W is anded with OUTPUT and CR + SH at AND gate 127 to generate Q. (The CR + SH signal is generated by OR gate 83 having inputs of CR and SH.) Q is then gated through OR gate 130 to generate PGO. Thus, a PGO has been generated with the carrier return code on the data buss. Again, it must be remembered that the carrier return code that will be used on this line is the one already existing in the sequence of text codes. Thus, the reason for providing a positive CLA (Control Line A) to place the carrier return code on the data buss is so that the carrier return code may be executed by the adjust logic as if it were being printed. The same logic in FIG. 4 applies if either a normal hyphen code or a required hyphen code is followed by a character code or a carrier return code. Upon the execution by the logic of the carrier return (either a normal carrier return or a required carrier return), the OUTPUT latch 81 is again reset through OR gate 82, since either the carrier return code or the required carrier return code on the data buss are two of the inputs of this OR gate.

A description of a lookahead failure (failure to detect a suitable line terminating condition in the "hot zone") will now be given beginning with the setting of the LKHEAD latch 87. Again, counter 92 has counted; however, there is no output from decode 94 within the duration of the six character lookahead. Therefore, the SUCCESS latch 96 does not set because there is no SALTC signal and register 97 will remain reset because no number will be stored in register 97. When the count state of counter 92 reaches 7, decode 100 generates an output which resets the LKHEAD latch 87. This signal is also gated through OR gate 89 to reset counter 92. At this time the COMP signal becomes positive. Since the SUCCESS latch 96 was not set, when counter 92 reaches the seventh state, the FAIL signal generated by AND gate 117 will set the MATCH latch 116. Simultaneously, the PLOOK latch 115 will set from the output provided by AND gate 113 enabled by LKHEAD (before resetting) and CTR = 7. During this time the operation flag code is recirculating through dynamic shift register 4, and when the operation flag code once again is decoded by shift register control and decode 3, the MATCH signal is anded with the FLAG signal at AND gate 118 to generate the SECMRST signal. Also, at this time the MATCH latch 116 is reset by FLAG.

Figure 5:
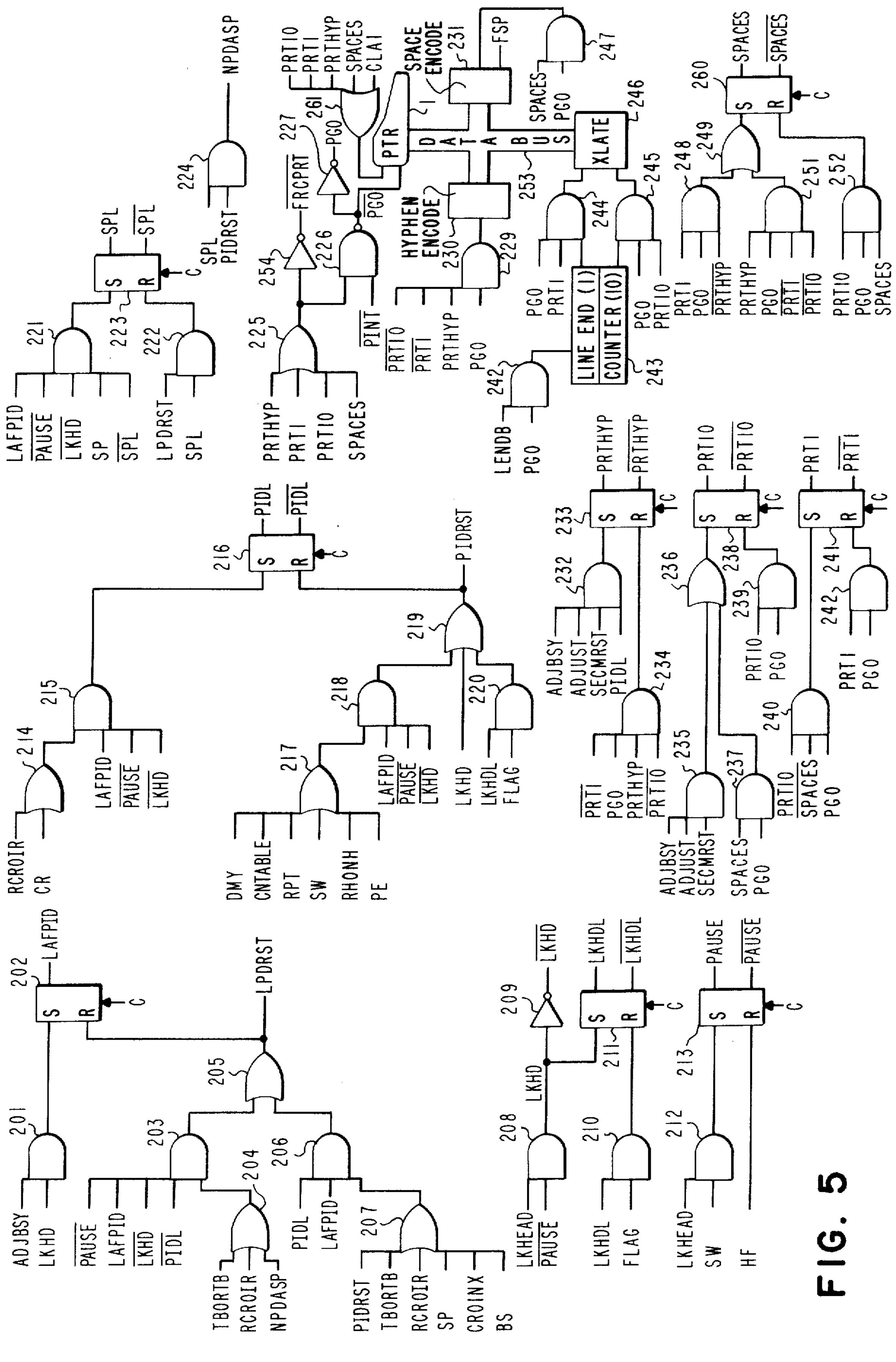

Referring now to FIG. 5, when the aforementioned LKHEAD latch 87 was set, the LKHD signal is generated by AND gate 208 having the previously mentioned input signal LKHEAD and also $\overline{PAUSE}$. LKHD is inverted by inverter 209 to provide $\overline{LKHD}$. The PAUSE latch 213 is needed only when a switch code (SW signal) was decoded during the lookahead as shown by AND gate 212. A bit time after LKHD becomes positive, the LKHDL latch 211 is set. Also, the LAFPID latch 202 also sets at this time through AND gate 201 having inputs of ADJBSY and LKHD. When the LKHEAD latch resets, a search for a paragraph identification begins. The paragraph identification check is actually done at the next interwood code (space code, carrier return code, etc.). When either a carrier return code (CR) or a required carrier return code or index return code (RCROIR) is detected the PIDL latch 216 is set through AND gate 215 and OR gate 214. If the next code is among the group of codes that are input to OR gate 217 (i.e., this code along with the line ending code does not define a paragraph identification) the PIDL latch 216 will reset through OR gate 219, AND gate 218, and OR gate 217. The inputs to OR gate 217 are generated by shift register control and decode 3 and include: DMY — dummy code; CNTABLE: RPT — repeat code; SW — switch code; RHONH — required hyphen or normal hyphen code; and PE — page end code. A PIDRST signal is generated thereby, which resets the LAFPID latch 202, through OR gate 205, AND gate 206, and OR gate 207, on which PIDRST is an input, Additional inputs of OR gate 207 include the following signals decoded by shift register control and decode 3: CROINX — carrier return or index code and BS — backspace code. Thus, if a lookahead failure had occurred, the PIDL latch will not be in a set condition at the upcoming SECMRST (FIG. 4). If the character code following the line ending code is one of a group of codes which are inputs to OR gate 207, the PIDL latch 216 remains set, but the LAFPID latch 202 resets through OR gate 205, AND gate 206 and OR gate 207. Thus, a paragraph identification has been detected.

If the interword code had been either a tab code or required tab code, then the LAFPID latch 202 would have been immediately reset through OR gate 205, AND gate 203, and OR gate 204, the inputs of OR gate 204 being TBORTB (tab code or required tab code), RCROIR (required carrier return or index return) and NPDASP (discussed below). If the interword code or codes had been a space code or codes, the SPL latch 223 would have set through AND gate 221, having inputs of LAFPID, $\overline{\text{PAUSE}}$, $\overline{\text{LKHD}}$, SP, and SPL. The paragraph identification check is now made as previously with the SPL latch 223 always being reset through AND gate 222 having inputs of LPDRST (from input of OR gate 205) and SPL. If no paragraph identification is detected after the space code(s), then the PIDRST and the SPL signal enable AND gate 224 to generate the NPDASP signal.

If the lookahead was a failure, a SECMRST will occur at the next appearance of the operation flag code at the shift register control and decode 3. At this time the LKHDL latch 211 will reset through AND gate 210 having inputs of LKHDL and FLAG, and the PIDL latch 216 will reset through OR gate 219 and AND gate 220 having inputs of LKHDL and FLAG.

Figure 2B:
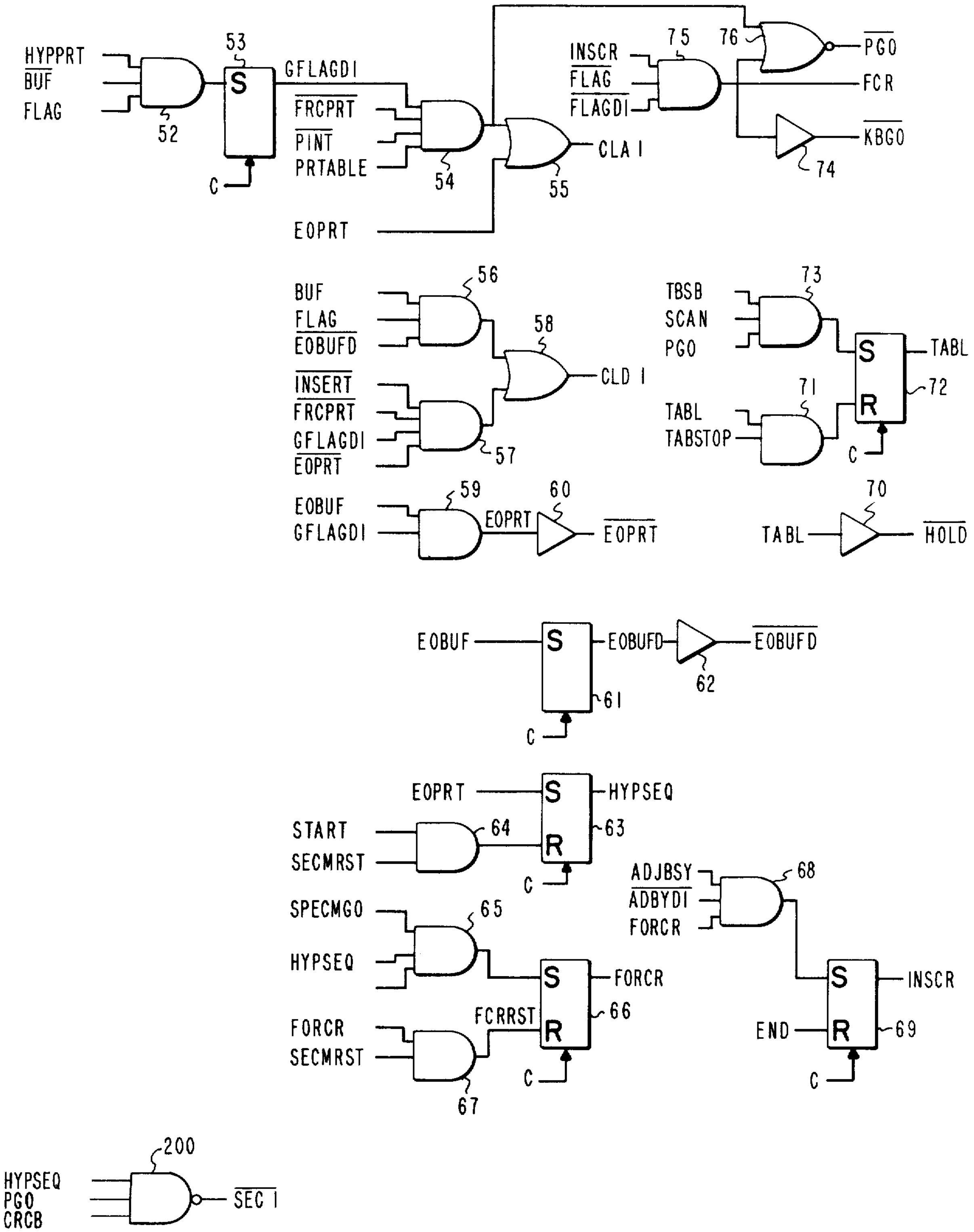

Referring now to FIG. 2A, the internal adjust logic 11 now takes over. In FIG. 2A, the SECMRST is anded with ADJUST and ADJBSY (the latter signals being positive because all of these operations are under the control of internal adjust logic 11) through AND gate 43 and OR gate 44 to set the BUF (back-up operation flag) latch 46. The operation flag code is now moved backward to the beginning of the overflow word. The BUF latch 46 will reset by enabling AND gate 47 with the input signals of FLAG, BUF and EOBUFD. The signal EOBUF, generated by shift register control and decode 3, is positive upon the decoding of any of the following codes: required carrier return, index return, carrier return, index, operation flag, dummy, page end, tab, required tab, space, or repeat. In FIG. 2B, EOBUFD is EOBUF delayed one bit time by delay 61, and is inverted by inverter 62 to produce $\overline{\text{EOBUFD}}$. AND gate 56, having inputs of BUF, FLAG, and $\overline{\text{EOBUFD}}$ is enabled to produce an output signal that is gated through OR gate 58 to generate CLD1. CLD1 is gated through OR gate 129 to generate CLD, which applies a positive level to control line D of shift register control and decode 3 for one bit time. Thus, the operation flag code is moved backwards through the word, a character per memory revolution, until a code in the EOBUF code group is detected. When this occurs, CLD is not driven for that code and the BUF latch 46 is reset through AND gate 47 having inputs of EOBUFD, FLAG, and BUF. Simultaneously, through AND gate 48, the HYPPRT latch 51 is set.

Simultaneously, occurring with the BUF routine, the forced printing of the line number, paragraph identification (if applicable), and the two spaces prior to the printing of the complete overflow word is being performed. This sequence of events was begun at the same time that the BUF latch 46 was set. Assuming that there was a paragraph identification following the overflow word, the PRTHYP latch 223 (FIG. 5) will be set by AND gate 232 having inputs of ADJBSY, ADJUST, SECMRST, and PIDL. Also, the PRT 10 latch 238 will be set through OR gate 236 and AND gate 235 having inputs of ADJBSY, ADJUST, and SECMRST. If the printer portion of keyboard-printer 1 is not busy ($\overline{\text{PINT}}$ at a positive level) the $\overline{\text{PGO}}$ output of NAND gate 226 is driven by the $\overline{\text{PINT}}$ signal and an output from OR circuit 225. PGO is generated through inverter 227. A bit time after $\overline{\text{PGO}}$ is driven, $\overline{\text{PINT}}$ is driven down by the printer's being busy, thereby degating NAND gate 226. Simultaneously, the contents of the tens section of LINE END counter 243 is gated onto the printer data buss 253 for printing, through XLATE 246 (printer encoding circuit) and AND gate 245 having inputs of PGO and PRT 10. The positive PRT 10 signal is gated through OR gate 261 to allow printer 1 to print the encoded tens count on data buss 253. Line end counter 243 is counted and kept current by an output of AND gate 242 having inputs of LENDB and PGO. It will be understood by those skilled in the art that there will be provided an AND gate 245 per bit of the ten's contents of LINE ENd counter 243, but for the simplicity of explanation, only one of said AND gates is shown.

At this time the tens digit of the line number has been printed. The PGO signal is anded with the PRT 10 signal to enable AND gate 239 to reset the PRT 10 latch 238. The PRT 1 latch 241 will be set by a positive signal from AND gate 240 having inputs of PRT 10, $\overline{\text{SPACES}}$, and PGO. As soon as the priinter becomes available, $\overline{\text{PGO}}$ is again generated by NAND gate 226 and the units digit of the line number stored in counter 243 will be gated onto printer data buss 253 for printing, through AND gate 244 and XLATE circuit 246, since the other inputs of AND gate 244 are enabled by PGO and PRT 1 and the PRT 1 signal is gated through OR gate 261 to enable printer 1. At this PGO, the PRT 1 latch 241 resets through AND gate 242 having inputs of PRT 1 and PGO. When the printer next becomes available, $\overline{\text{PGO}}$ is again driven through NAND gate 226 and OR gate 225 because the PRTHYP latch 223 has been set from the beginning of the sequence. At this time, a hyphen is placed on the data buss 253 through HYPHEN ENCODE 230 and AND gate 229 having inputs of $\overline{\text{PRT 10}}$, $\overline{\text{PRT 1}}$, PRTHYP, and PGO. Printer 1 is enabled to print the hyphen because of the positive PRTHYP signal gated through OR gate 261.

Simultaneously, the PRTHYP latch 233 resets through AND gate 234 (having the same inputs as AND gate 229), and the SPACES latch 230 sets through OR gate 249 and AND gate 251, the latter AND gate also having the same inputs as AND gate 229. When the printer becomes available $\overline{\text{PGO}}$ is again driven through NAND gate 226 and OR gate 225. A space code is placed upon the data buss 253 through SPACE ENCODE 231 and AND gate 247 having inputs of SPACES and PGO. Printer 1 is enabled by the positive SPACES signal gated through OR gate 261. At this time the PRT 10 latch 238 is again set through OR gate 236 and AND gate 237 having inputs of SPACES and PGO. When the printer again becomes available, a second space code is output by driving PGO. At this time the PRT 10 latch 238 will be reset through AND gate 239 and the SPACES latch 250 will be reset through AND gate 252 having inputs of PRT 10, SPACES, and PGO.

If a paragraph identification had not followed the overflow word, the forced printing would have occurred but the hyphen would not have been printed because the PRTHYP latch would not have been set. In this case the SPACES latch 250 would be set at the proper time through OR gate 249 and AND gate 248 having inputs of PRT 1, PGO, and $\overline{\text{PRTHYP}}$. Thus, the output of a hyphen code indicates that the overflow word is the last word of a paragraph.

It will be noted that during all forced printing of the line number, hyphen, and spaces the signal, $\overline{\text{FRCPRT}}$, is being driven through inverter 254. This is done to inhibit the forced printing of the overflow word until the previous forced printing of the line number paragraph identification and spaces has been accomplished even through the HYPPRT latch 51 (FIG. 2A) may have already set.

At this time, the forced printing of the overflow word spanning the "hot zone" will be begun. Referring now to FIGS. 2A and 2B, although AND gate 52, having inputs of HYPPRT, $\overline{\text{BUF}}$ and FLAG becomes positive at every occurrence of the operation flag code and delay 53 becomes active thereby, CLA1 will not be driven by AND gate 54 and OR gate 55, because $\overline{\text{FRCPRT}}$ is still being driven, even through PRTABLE may be positive. (PRTABLE is a signal provided by shift register control and decode 3, upon the decoding of any of the following codes: characters, underscores, required hyphens, normal hyphens, dead keys, backspaces, switches, required spaces, and half-indexes). Until the line number and two spaces have been printed (with or without the paragraph-end indicating hyphen), CLA will not be positive. When $\overline{\text{FRCPRT}}$ is released and the printer has printed a character of the overflow word, then $\overline{\text{PINT}}$ will again become positive. It is at this time that AND gate 54 and OR gate 55 become active to generate CLA1, which is gated through OR gate 128 to drive CLA. The output of AND gate 54 is also an input of NOR gate 76, where it simultaneously drives $\overline{\text{PGO}}$. Also, simultaneously, CLD1 is being driven through AND gate 57 and OR gate 58, which is gated through OR gate 129 (FIG. 4) to drive CLD. Thus, the printer 1 is activated by the fact that the HYPPRT latch 51 is set and by the positive CLA1 signal being gated through OR gate 261 to enable printer 1. The printer begins printing the overflow word and will continue to do so until an end-of-print signal, EOPRT, becomes positive. The EOPRT signal is indicative of the decoding of any of the codes in the same group of codes that is contained in EOBUF. The generation of the EOPRT signal and the inversion thereof is shown at AND gate 59 and inverter 60, respectively. Thus, EOPRT is the EOBUF group of codes anded with the output of delay 53, GFLAGD1. When an EOPRT does occur a positive CLD will not occur because of the negative $\overline{\text{EOPRT}}$ input to AND gate 57, and $\overline{\text{PGO}}$ will not occur because the EOPRT is not in the PRTABLE group input to AND gate 54. BUF latch 46 then sets again through AND gate 45 and OR gate 44. Now that both BUF latch 46 and the HYPPRT latch 51 is set, another backup of the operation flag code will be performed until another EOBUF occurs. This places the operation flag back to the beginning of the overflow word for the operator's decision described below. This generates an EOBUFD from delay 61 which resets the BUF latch 46 through AND block 47 and resets the HYPPRT latch through AND gate 49.

Parenthetically, at the occurrence of the EOPRT, the HYPSEQ latch 63 sets. The generation of the BUFRST from AND gate 47 then resets the ADJBSY latch 27.

With ADJBSY being reset, SYSBSY drops a bit time later. The system has been freed for the operator to now make a hyphenation decision. The operator can now make one of the following three decisions: leave the entire word on this line, place the entire word on the next line, or hyphenate the overflow word. Referring to FIg. 4, the PLOOK latch 115 remains set and the COMP signal remains positive. Playout of a succeeding space or a hyphen within the overflow will set the LCHOS latch 108. Therefore, at the appearance at the next print character, ICR is again driven through AND gate 109 and the operations are as previously described. At the keyboard-printer 1, the operator may play out the overflow word character by character, since the operation flag was moved back to the beginning of the word as described above. The operator may then insert a hyphen at the desired location in the word, at which time the signal SAMPDB is gated through OR gate 101, AND gate 103, OR gate 106 to set the LCHOS latch 108. Then, at the next output of the next input character, ICR is driven through AND gate 109, the carrier return code is put on the data buss, and PGO is driven as previously described.

The second mode of handling the hyphenation decision leaves the entire word on the line on which it occurs. the word may be played out in its entirety and a carrier return then inserted. Thirdly, the operator may simply depress the carrier return key before playing out any of the word, and a carrier return code is inserted preceding the word, thereby placing the entire word on the next line. When the carrier return code is put on the data buss, PGO is driven. It will be observed in FIG. 4, that thee PLOOK latch 115 is always reset through AND gate 114 with a CRCB signal anded with a PGO. Register 97 is reset, and (referring to FIG. 2A) counter 36 is also reset by AND gate 38 having inputs of PGO and CRCB. Also, with the positive signals of SCAN and HYPSEQ, at the occurrence of the END signal generated by AND gate 38, the START latch 22 is set through OR gate 17 and AND gate 16. With the HYPSEQ latch 63 set, PGO and CRCB forces line mode by driving $\overline{\text{SEC 1}}$ through NAND gate 200. This sequence is executed so that the forced line mode will be satisfied by the upcoming carrier return such that the resulting SECMRST may be used as a timing condition. The execution of the carrier return code satisfies line mode, and at this time a SECMRST signal, enabled by the $\overline{\text{SEC 1}}$ signal, is generated from the host text processing system (not shown) with the simultaneous dropping of SYSBSY. However, since HYPSEQ is positive, the START latch 22 will not reset through OR gate 20 and AND gate 21.

At this time the $\overline{\text{IR2}}$ line is driven by NOR gate 24 and AND gate 23, the latter gate having inputs of START, SCAN, and $\overline{\text{SYSBSY}}$. The $\overline{\text{IR2}}$ signal is inverted through inverter 32 to generate IR2. SYSBSY again becomes positive and the ADJBSY latch 27 is again set through AND gate 26. Also, when the system generated SECMRST, the HYPSEQ latch 63 (FIG. 2B) is reset through AND gate 64 having inputs of START and SECMRST. Therefore, with ADJBSY, $\overline{\text{ADBYD1}}$, and $\overline{\text{HYPSEQ}}$, the START latch 22 resets through AND gate 19, and OR gate 20. Therefore, through NOR gate 29, the $\overline{\text{SECMGO}}$ signal is again negative which restarts the scanning operation at the decoding of the next operation flag code. This occurs when the OUTPUT latch 81 (FIG. 4) sets through AND gate 80.

Since the insertion from the keyboard ends with a SECMRST signal, the logic of handling an inserted carrier return from the keyboard appears exactly like the case of a carrier return being inserted by the adjust logic. There is a slight difference in operation if the internal adjust key is utilized in making the hyphenation decision. The START latch 22 is set through OR gate 17 and AND gate 18, the latter gate having inputs of SPECMGO and $\overline{\text{INHST}}$. Also, with HYPSEQ positive, FORCR latch 66 (FIG. 2B) is set through AND gate 65. The interrupt scheme is the same as previously described, and when the ADJBSY latch 27 sets, ADJBSY, $\overline{\text{ADBYD1}}$, and FORCR set the INSCR latch 69 (FIG. 2B) through AND gate 68. With the INSCR latch 69 set, and so long as there is not an operation flag code being decoded by shift register control and decode 3, then AND gate 75 provides an output upon receiving the inputs of INSCR, $\overline{\text{FLAG}}$, and $\overline{\text{FLAGD1}}$. In FIG. 3, the decoding of the operation flag code is delayed one bit time by delay 154 to generate FLAGD1, which is inverted by inverter 155 to generate $\overline{\text{FLAGD1}}$. FLAG is inverted by inverter 156 to generate $\overline{\text{FLAG}}$. $\overline{\text{PGO}}$ is driven through NAND gate 76, $\overline{\text{KBGO}}$ is driven through inverter 74, and FCR is driven with the output of AND gate 75. Therefore, the situation of a carrier return code on the data buss with an associated PGO again exists. END is generated which resets every latch that is normally reset including, in this case, the INSCR latch 69 in FIG. 2B. Actually, the system considers that the carrier return code is coming from the carrier return key at the keyboard. As with all inserts, an insert operation is followed by a SECMRST. Therefore, at this SECMRST after the insert, AND gate 67 is active with the inputs of FORCR and SECMRST to generate a FCRRST which resets the FORCR latch 66 and is also gated through OR gate 20 to reset the START latch 22. At this time $\overline{\text{SECMGO}}$ is driven by NAND gate 29. Referring again to FIG. 4, scanning is resumed with the OUTPUT latch 81 having been set through AND gate 80 with SECMGO becoming positive with the next decoding of the operation flag code.

Next, a description will be given of the handling of tabulation codes in the sequence of text codes. Because the printer is not printing during the scan operation, tabs must be handled in a special manner. As described above, the positions of tab stops set at the keyboard are stored in random access memory 37. Tab stops are enterable into the random access memory 37 by depressing a tab set key on the keyboard, after the print carrier is spaced across the platen to the desired tab location. During this spacing of the print carrier, counter 36 in FIG. 2A is incremented and the output lines of counter 36 are the address lines for random access memory 37. When the operator sets a tab stop, a bit in the random access memory 37 is turned on, or set, at an address in random 37 corresponding to the position of the print carrier. Thus, with a tab stop set and with a tab code appearing on the data buss in either playback or keyboarding, TBSB becomes positive (FIGS. 3 and 2B), which defines either type of tab on the data buss. This activates AND gate 73 having inputs of TBSB, SCAN, and PGO, which sets the TABL latch 72. With the TABL latch being set, the counter 36 is counter through OR gate 35. Counter 36 counts at the clock rate, addressing random access memory 37. When a tab stop is detected (the next set bit in random access memory 37), a positive TABSTOP signal is generated by random access memory 37 which is anded with TABL at AND gate 71 to reset the TABL latch 72. Also, during the time that TABL is positive, negative $\overline{\text{HOLD}}$ signal is generated by inverter 70, which resets the OUTPUT latch 81 (FIG. 4) and prevents said latch from setting through AND gate 80.

Referring now to FIG. 3, a description will be given of the non-terminating adjust logic. This logic is responsive to line terminating codes that already exist in the data sequence but occur in the middle of a line and must not be honored as line terminations. This logic also removes normal hyphens (such as a hyphen previously placed in the text sequence as the last code in a line, as opposed to a required hyphen that must always be printed, i.e., "mother-in-law") in the middle of a line. It replaces a carrier return with a space, removes a carrier return sequence, and also honors paragraph identifications that are found in the middle of the line. Required carrier returns are handled directly without any type of lookahead.

In the case of the normal hyphen in the middle of a line, AND gate 149 is enabled by the inputs of OUTPUT, ADJUST, SH, and $\overline{\text{TERM}}$, and the output of AND gate 149 is gated through OR gate 151 to generate FDLT, the latter signal also being inverted by inverter 153 to generated $\overline{\text{FDLT}}$. In FIG. 4, the LCHOS latch 108 sets through OR gate 106 and AND gate 104, having inputs of OUTPUT, HYP,and FDLT. FDLT is also gated through OR gate 131 to drive CLE. By driving CLE a delete code may be placed on the data buss by the DELETE ENCODE 265 enabled by FDLT, and the delete code is gated directly into the shift register control and decode 3 to replace the normal hyphen with the delete code. Assuming that a print character code follows the normal hyphen, the LCHOS latch 108 resets through OR gate 107, AND gate 105, and OR gate 101. However, if a carrier return code follows the normal hyphen, then the LOOK latch 139 (FIG. 3) would immediately be set through AND gate 136 having inputs of OUTPUT, ADJUST, CR, $\overline{\text{TERM}}$, and $\overline{\text{XLOOK}}$. The LOOK signal then resets OUTPUT latch 81 (FIG. 4) through OR gate 82. Then, with the LOOK latch 139 being set and the carrier return code not being followed by a non-printing code ($\overline{\text{NPA}}$ signal from shift register control and decode 3), AND gate 137 is enabled by LOOK and $\overline{\text{NPA}}$ to reset the LOOK latch 139 and to simultaneously set the XLOOK latch 140. At this time, the LCHOS latch 108 (FIG. 4) is also set from the hyphen code preceding the carrier return code. In FIG. 3, therefore, as the operation flag code recirculates through the dynamic shift register 4 and is shifted back into the shift register control and decode 3, and with XLOOK and OUTPUT positive, (both being set at the decoding of the operation flag code) and a carrier return code, CR, AND gate 138 is enabled which resets the XLOOK latch 140. Simultaneously, with LCHOS positive and the DO IT latch 145 reset, AND gate 150 is enabled. The output of AND gate 150 is gated through OR gate 151 to generate another FDLT which directly replaces the carrier return, as described above. Assuming that the next character is a print character, LCHOS latch 108 will reset with a PGO through OR gate 101, through AND gate 105, and through OR gate 107, since the character code is not a hyphen code, space code, or dummy code on the data buss.

A description of the handling of a carrier return code occurring in the middle of a line will now be given. The LOOK latch 139 is set through AND gate 136 and the XLOOK latch 140 is set when the LOOK latch 139 is reset. Immediately upon the occurrence of the LOOk signal, the OUTPUT latch 81 (FIG. 4) is reset through OR gate 82. The operation flag code is then released from the shift register control and decode 3. Since the carrier return code in question is not preceded by a function other than a carrier return code or a space code or a hyphen code, neither the LCHOS latch 108 nor the DO IT latch 145 is set. With neither of these latchs set, when the operation flag code recirculates back around the dynamic shift register 4 and is decoded by the shift register control and decode 3, the OUTPUT latch 81 is again set. With the XLOOK latch 140 and the OUTPUT latch 81 set and the decoding of a carrier return code, AND gate 138 becomes active to reset the XLOOK latch 140 and also to enable AND gate 152 to generate the FSP signal, since the DO IT latch 145 is not set and FDLT is not positive. Since the LCHOS latch 108 is not set, AND gate 150 is not activated. When FSP was generated by AND gate 152, OR gate 124 (FIG. 4) was also activated, which generated a PGO through OR gate 130 and AND gate 126. A space code was placed on the data buss by SPACE ENCODE 231, enabled by the positive FSP signal. Therefore, the carrier return code is directly replaced by a space code.

Paragraph identification sequences detected in the middle of a line are handled by the DO IT latch 145. A carrier return code immediately followed by any function defines a paragraph identification. A function includes another carrier return code, or required carrier return code, or index return code, or space code, or backspace code, or any other printer function. When a carrier return code is detected during scanning (not in the "hot zone") AND gate 136 is activated and sets the LOOK latch 139. The LOOK latch 139 is reset through AND gate 137 and the XLOOK latch 140 is set. However, if the next code after the carrier return code is a function code, then the DO IT latch 145 is set through OR gate 143 and AND gate 142. Again, the LOOK latch 139, when setting, immediately resets the OUTPUT latch 81 in FIG. 4. The operation flag code is again released from the shift register control and decode 3 to recirculate through the dynamic shift register 4 with the other codes circulating therein. When the operation flag code is again decoded by the shift register control and decode 3, the OUTPUT latch 81 once again sets through AND gate 80. Thus, with XLOOK and OUTPUT both positive, and a carrier return code being decoded, the XLOOK latch 140 is reset through AND gate 138. Also, AND gate 123 is activated with inputs of OUTPUT, CR, and DO IT. OR gate 128 is then activated, driving CLA. Also, the output of AND gate 138 labeled Z drives OR gate 129 which generates CLD. DO IT is also gated through OR gate 124, the output of which is anded with CR and OUTPUT at AND gate 126 to drive OR gate 130, thereby generating PGO at the output of OR gate 130 and PGO at the output of inverter 134. Thus, the carrier return code, which is the first character of the paragraph identification sequence, is output on the data buss as if it were being executed by a printer.

Assuming that the next code is a carrier return code, the occurrence of the first carrier return code set the LCLE latch 146 with the END signal, which is generated by CRCB and PGO. The occurrence of the first carrier return reset the OUTPUT latch 81 through OR gate 82 in FIG. 4. After the operation flag code recirculates through dynamic shift register 4 and is again decoded by shift register control and decode 3, OUTPUT latch 81 is again set. Since the next code is another carrier return, then the LOOk latch 139 sets through AND gate 136. The XLOOK latch 140 also sets again. However, since the LCLE latch 146 was set, AND gate 141 is activated to again set the DO IT latch 145 through OR gate 143. Again the setting of the LOOK latch immediately resets the OUTPUT latch 81. When the operation flag code is again decoded by shift register control and decode 3, acceptance of the carrier return code will occur by virtue of the DO IT latch 145 being set. In this interaction, the LCLE latch 146 and the DO IT latch 145 will continue to operate in this manner as long as there are carrier return codes that follow. The LCLE latch 146 will be reset by AND gate 144 by utilizing the KDSM output of AND gate 101 (FIG. 4).

Application of a positive SCNRST signal to the reset input of SCAN latch 14 enables the termination of the internal adjust mode of operation.

Thus, a system is provided wherein textual character codes and control codes, including tab codes, may be input from a keyboard to a memory, which in the preferred embodiment may be a dynamic shift register. A random access memory electronic tab rack includes a bit storage position for each character position along the line of a printer. Tabs set from the keyboard having particular character positions cause the corresponding bits in the electronic tab rack to be set. In an adjustment operation, control logic is provided for comparing the accumulated count of escapement codes in the memory with a predetermined right margin count minus the "hot zone" width. Carrier return codes occurring before a compare is reached are replaced with delete codes. In the "hot zone", a carrier return code is inserted in the position of the last proper line terminating condition existing therein. If no such condition exists in the "hot zone" the control logic enables the printer to print out the entire word that spans the "hot zone". Included in this print out is the line number on which the non-terminating condition occurred, as well as an indication to the operator of whether or not the word is the last word of a paragraph.

When a tab code is sensed during this adjustment procedure, logic is provided for calculating the amount of space required for eventual printer execution of the tab code by counting the number of character positions between appropriate tab codes in the electronic tab rack. The number of character codes and space codes to be placed on the line including the tab code is, thus, diminished in accordance with the amount of space that will be required for execution of the tab code by the printer.

The time required to adjust the margins of a page of text in this manner can be extremely short in comparison to the time required when printing is included in the adjust operation, because the operation disclosed herein is not limited by the speed of the printer.

While the invention has been particularly shown and described with reference to a preferred embodiment thereof, it will be understood by those skilled in the art that various changes in form and details may be made therein without departing from the spirit and scope of the invention.

What is claimed is:

1. A system for arranging a sequence of codes stored in a memory to form text lines of said codes in said memory, each of said lines having a total line escapement length within a predetermined range, comprising:

means for inputting codes into said memory;

means for generating line ending codes;

means for deleting line ending codes and hyphen codes from said memory;

control logic means including line escapement length determining means selectively connecting said line ending code generating means to said inputting means and selectively connecting said deleting means to said memory for automatically inputting line ending codes into said sequence of codes previously stored in said memory and for automatically deleting previously stored line ending codes and hyphen codes from said seequence of said codes stored in said memory to form said text lines of said codes in said memory; and said control logic means including tabulation logic means connected to said line escapement length determining means and operatively independent of any output device for calculating the escapement length required for execution of a tabulation code in said sequence of said codes in said memory.

2. The system of claim 1 further comprising:

means for generating space codes; and said control logic means including means connected to said line escapement length determining means and responsive to a state of said line escapement length determining means in which said total line escapement length within a predetermined range has not been met for selectively connecting said space code generating means to said inputting means for replacing a line ending code that is to be deleted with a space code when said line ending code to be deleted immediately succeeds a test code.

3. The system of claim 2 wherein said codes in said text lines are arranged in words and said words in said lines are separated by space codes and further comprising:

output means for providing an operator readable output of selected codes in said memory; and means included in said control logic means connecting said memory to said output means for enabling, during the formation of one of said text lines, a readable output on said output means of the last word of said one of said lines if said last word would result in said one of said lines having a total line escapement length in excess of said predetermined range and the absence of said last word would result in said one of said text lines having a total line escapement length less than said predetermined range.

4. The system of claim 3 wherein said control logic means further comprises means enabling a readable output on said ouput means of a line number corresponding to said one of said text lines.

5. The system of claim 4 wherein said control logic means further comprises means enabling said output means to provide an indication on said output means if said last word of said one of said text lines is the last word of a paragraph.

6. The system of claim 5 wherein said tabulation logic means includes a storage means having a plurality of bits, one of said bits corresponding to each of the character locations on a line of said output means, one of said bits being in a first binary state when a tabulation stop has been set at a character location on said output means corresponding to said one of said bits and said one of said bits being in a second binary state when a tabulation stop has not been set on said output means corresponding to said one of said bits.

7. A system for arranging in a memory a previously stored sequence of text codes and control codes including tabulation codes to form a plurality of text lines of said codes, each of said text lines having a total line escapement length within a predetermined range, said system comprising:

means for sequentially accessing said codes stored in said memory;

means responsive to said accessing means and operatively independent of any output device for determining an escapement corresponding to each of said codes, including said tabulation codes;

means advanced by said escapement determining means for accumulating said total line escapement length for a group of said codes to form one of said plurality of text lines;

means responsive to said accessing means for detecting each line terminating condition in said sequences codes;

means responsive to said escapement determining means and said line terminating condition detecting means for inputting line ending codes into said sequence upon the occurrence of the last line terminating condition associated with a particular line before said total line escapement length exceeds said predetermined range; and means responsive to said accessing means and said escapement determining means for deleting previously stored line ending codes from said sequence upon the occurrence of a line ending code in said sequence before said total line escapement length has reached said predetermined range.

8. The system of claim 7 further comprising:

means responsive to said accessing means for detecting the sequence of a text code immediately followed by a line ending code; and means responsive to said deleting means and said sequence detecting means for replacing a line ending code that is to be deleted with a space code when said line ending code to be deleted immediately follows a text code.

9. The system of claim 8 wherein said codes in said text lines are arranged in words and said words in said lines are separated by space codes and further comprising:

output means for providing an operator readable output of selected codes in said memory; and means connecting said memory to said output means for enabling, during the formation of one of said text lines, a readable output on said output means of the last word of said one of said lines if said last word would result in said one of said lines having a total line escapement length in excess of said predetermined range and the absence of said last word would result in said one of said text lines having a total line escapement length less than said predetermined range.

10. The system of claim 9 further comprising means enabling a readable output on said output means of a line number corresponding to said one of said text lines.

11. The system of claim 10 further comprising means enabling said output means to provide an indication on said output means if said last word of said one of said text lines is the last word of a paragraph.

* * * * *